Figure 1:
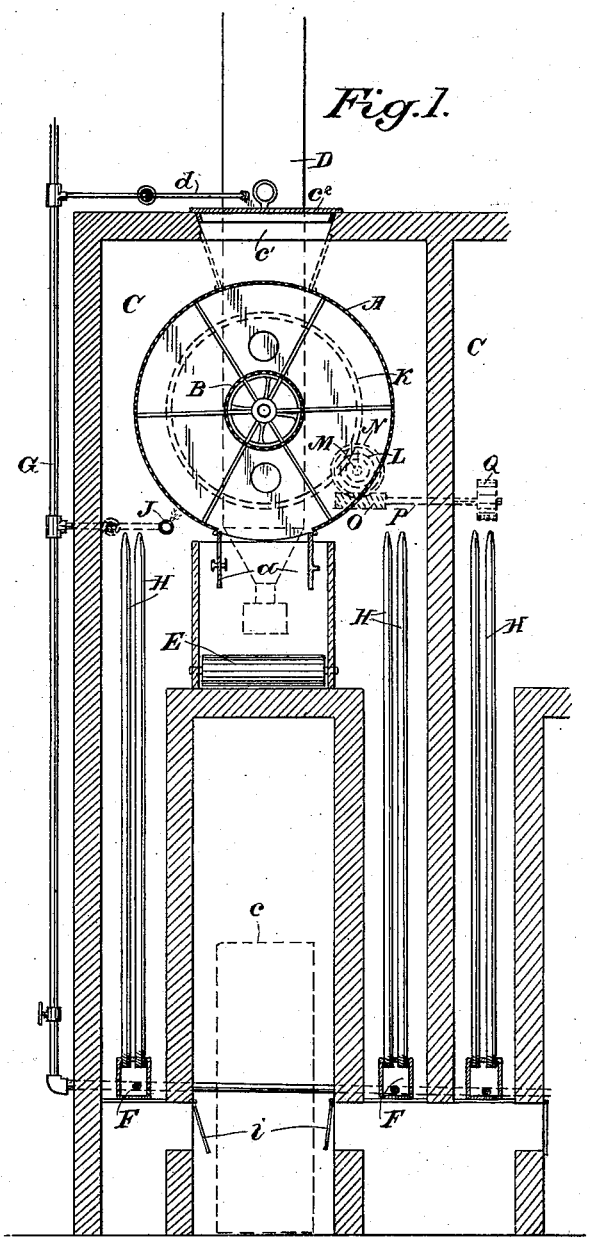

(No Model.) 2 Sheets—Sheet 1.

W. J. HALL & J. W. CASPER.
DRIER.

No. 567,386. Patented Sept. 8, 1896.

Witnesses,

Inventors,
William J. Hall
Joseph W. Casper
By Dewey & Co.
Attys

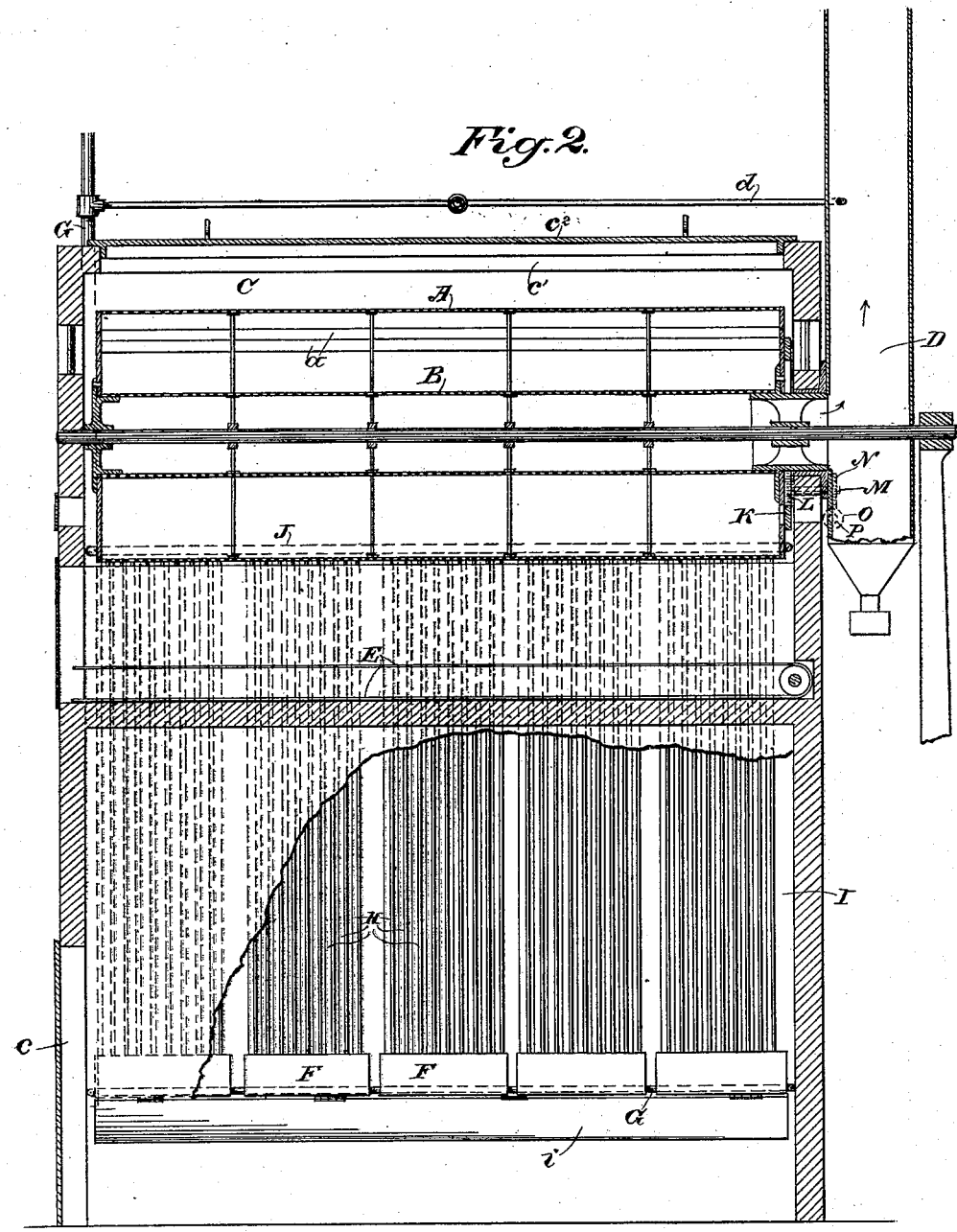

UNITED STATES PATENT OFFICE.

WILLIAM J. HALL AND JOSEPH W. CASPER, OF SACRAMENTO, CALIFORNIA.

DRIER.

SPECIFICATION forming part of Letters Patent No. 567,386, dated September 8, 1896.

Application filed September 6, 1895. Serial No. 561,694. (No model.)

*To all whom it may concern:*

Be it known that we, WILLIAM J. HALL and JOSEPH W. CASPER, citizens of the United States, residing at Sacramento, county of Sacramento, State of California, have invented an Improvement in Driers; and we hereby declare the following to be a full, clear, and exact description of the same.

Our invention relates to that class of driers in which a foraminous or screen cylinder containing the material to be dried rotates within a chamber and is subjected to heated air therein.

Our invention consists of the constructions and combinations of devices which we shall hereinafter fully describe and claim.

Though our invention may be used for the drying or curing of any material with which it can be used, our special object is to provide a simple and effective machine or apparatus for drying or curing hops.

Referring to the accompanying drawings, Figure 1 is a vertical cross-section of our drier. Fig. 2 is a vertical longitudinal section of the same.

A and B are concentric cylinders made of foraminous, perforated, screen, or other openwork material. The outer cylinder A is to contain the hops or other material to be dried, and is provided with a peripheral opening, controlled by swinging gate $a$, said opening serving both as an inlet and a discharge. These cylinders are mounted and adapted to rotate within the upper portion of a chamber or compartment C, which is, in practice, constructed of brickwork, and is practically tight, except for suitable entrances for air, which may be located at any desirable point or points, but here shown as in one end of the chamber, as indicated at $c$. The inner cylinder B communicates directly at one end with the vent-stack D, the height of which is to be sufficient to insure a current or draft of air from the entrance $c$, through chamber C, and inwardly and centrally through the cylinders to and through said stack; and in order to increase said current and insure perfect circulation, if necessary, there is a steam-pipe $d$ leading into the stack and from which a jet of steam may be emitted.

In the top wall of the chamber C is a hopper-opening $c'$, normally closed by a cover $c^2$. With this opening the swinging gates $a$ of the cylinder A combine when open to form a perfect hopper, through which the material may be supplied to said cylinder. These gates $a$ when closed are held so by a suitable latch, which upon being released, when the gates are lowermost, will allow them to swing open by gravity, and deliver the contents of the cylinder into or upon a suitable receptacle below, here shown as an endless traveling-carrier E, within suitable guide-walls. Within the chamber C, along its side walls, are connected steam-chambers F, supplied with steam from a controllable pipe G. From these chambers rise the steam-radiator pipes H, which extend up on each side of the carrier-channel and terminate at the plane of the bottom of the cylinder A, or thereabout. In order to insure the flowing air coming in contact with these heating-surfaces, we may confine them in open-topped casings I, to which the air is admitted through gates $i$. Thus the air must pass close to the heating-surfaces and be thoroughly heated by the time it reaches the cylinders. Any number of driers may be arranged side by side, each having its own heating-surfaces and mounted in its own chambers, which will be distinct except at their bases, where they may communicate.

J is a pipe leading from the steam-pipe into the chamber C. This pipe is perforated and is adapted to admit steam to the chamber whenever it becomes necessary to what may be termed "vaporize" it. With hops it becomes necessary, at times, to more perfectly bleach them. When they are too dry, the sulfur fumes will not act properly, and it is then required to moisten the hops. This we do by means of steam admitted through pipe J. A very slow rotary movement is imparted to the cylinders A B by suitable means. These are here shown as a gear K on the cylinder end, a pinion L, meshing with said gear and mounted upon a shaft M, on the other end of which is a worm-pinion N, and a worm O on a shaft P, driven by a pulley Q from suitable power.

The operation is as follows: The hops are supplied to the cylinder A through hopper-opening $c'$ and gates $a$. The latter are then closed and the cover $c^2$ replaced. The cylinders are slowly rotated, and the current of heated air passes inwardly through the hops and out through the vent-stack. This gentle movement of the hops, while thoroughly exposing them to the action of the heat, does not bruise or break them as does the customary operation of turning them over with shovels and rakes on a drying-floor, and as a consequence they are uniform in appearance and all are equally dry, with no loss of valuable portions and properties. When dried, the hops are discharged through gates $a$ upon the underlying carrier, by which they are removed.

Having thus described our invention, what we claim as new, and desire to secure by Letters Patent, is—

1. A drier comprising a tight chamber or compartment having an air-inlet and an exhaust-stack for inducing a current, concentric rotating screen-cylinders mounted within the chamber or compartment, the outer cylinder being adapted to receive the material to be dried and having swinging gates acting in connection with the feed-hopper, and one end of the inner cylinder communicating with the exhaust-stack, open-topped casings in the lower portions of which the air is admitted and independent heaters in said casings for heating the air as it passes to the cylinders.

2. A drier comprising a tight chamber or compartment having an air-inlet and an exhaust-stack, concentric rotating screen-cylinders within the chamber or compartment, the outer cylinder receiving the material to be dried and the inner cylinder communicating with the exhaust-stack to insure a current of air flowing through the cylinders, open-topped casings upon each side of the lower portion of the chamber, with gates controlling the admission of air to their lower portions, and vertically-disposed steam-pipes in said casings, for heating the air as it passes to the cylinders.

3. A drier comprising a chamber or compartment having an air-inlet and a vent-stack, concentric rotating screen-cylinders mounted within the chamber or compartment, the outer cylinder being adapted to receive the material to be dried, and having swinging gates acting in connection with the feed-opening of the chamber to form a feed-hopper, and one end of the inner cylinder communicating with the vent-stack, open-topped casings upon each side of the chamber steam-radiators within the open-topped chambers for heating the air, a steam-pipe leading into the vent-stack and a perforated steam-connected pipe within said compartment for admitting moisture as required.

In witness whereof we have hereunto set our hands.

WILLIAM J. HALL.
JOSEPH W. CASPER.

Witnesses:
J. E. D. BALDWIN,
A. E. MORRISON.